INVENTOR
ULRICH G. MARKS
by: Wolfe, Hubbard, Voit & Osann
ATTYS.

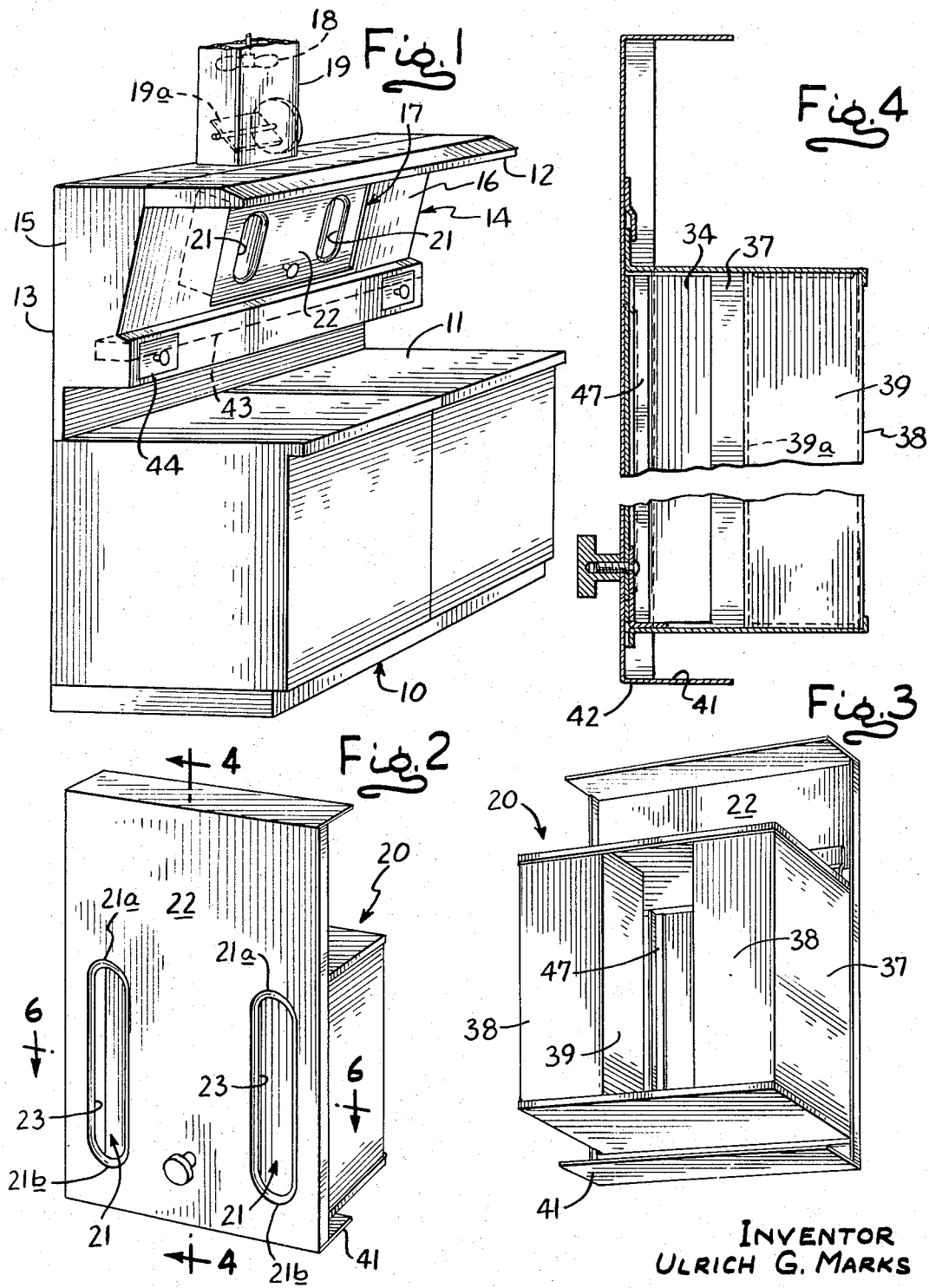

United States Patent Office 3,376,804
Patented Apr. 9, 1968

3,376,804
DRIPLESS GREASE EXTRACTOR FOR KITCHEN HOODS
Ulrich G. Marks, Chicago, Ill., assignor to Cockle Ventilator Company, Inc., Wheeling, Ill., a corporation of Ohio
Filed May 23, 1966, Ser. No. 551,978
3 Claims. (Cl. 98—115)

ABSTRACT OF THE DISCLOSURE

A dripless extractor for removing grease and other contaminants from a vaporous stream passing through the extractor. The extractor consists of a housing with a front wall provided with an entranceway, an internal baffling arrangement, and a rear wall provided with an exit way. The entranceway is described as having an internal inturned flange around its periphery and rounded corners to prevent the dripping of condensed vapors from the edges of the entranceway.

---

The present invention relates generally to grease extractors for ventilating systems and, more particularly, to an improved grease extractor for removing grease and oil vapors from a hot vaporous exhaust stream in a ventilating system of the type commonly employed with cooking ranges and the like.

It is a primary object of the present invention to provide an improved grease extractor of the type which removes the grease and oil from a hot vaporous exhaust stream by controlling the fluid flow, i.e., without the use of filtering media, and which prevents condensed vapors from dripping from the periphery of the entranceway to the extractor.

A related object of the invention is to provide an improved grease extractor of the foregoing type which prevents the accumulation of condensed vapors around the periphery of the extractor entranceway so as to prevent dripping of the condensed vapors from the extractor onto the underlying cooking surface.

Another object of the present invention is to provide an improved grease extractor of the type described above which can be manufactured quickly and efficiently at a minimum cost.

Other objects and advantages of the invention will become apparent from the following description and appended claims and upon reference to the drawings, in which:

FIGURE 1 is a perspective view of a conventional cooking range and its associated ventilating system including a grease extractor embodying the present invention;

FIG. 2 is a front perspective of the grease extractor unit shown in FIGURE 1 but removed from the ventilating system;

FIG. 3 is a rear perspective of the grease extractor unit shown in FIGURE 2;

FIG. 4 is a vertical section taken along line 4—4 in FIGURE 2;

Figure 5:
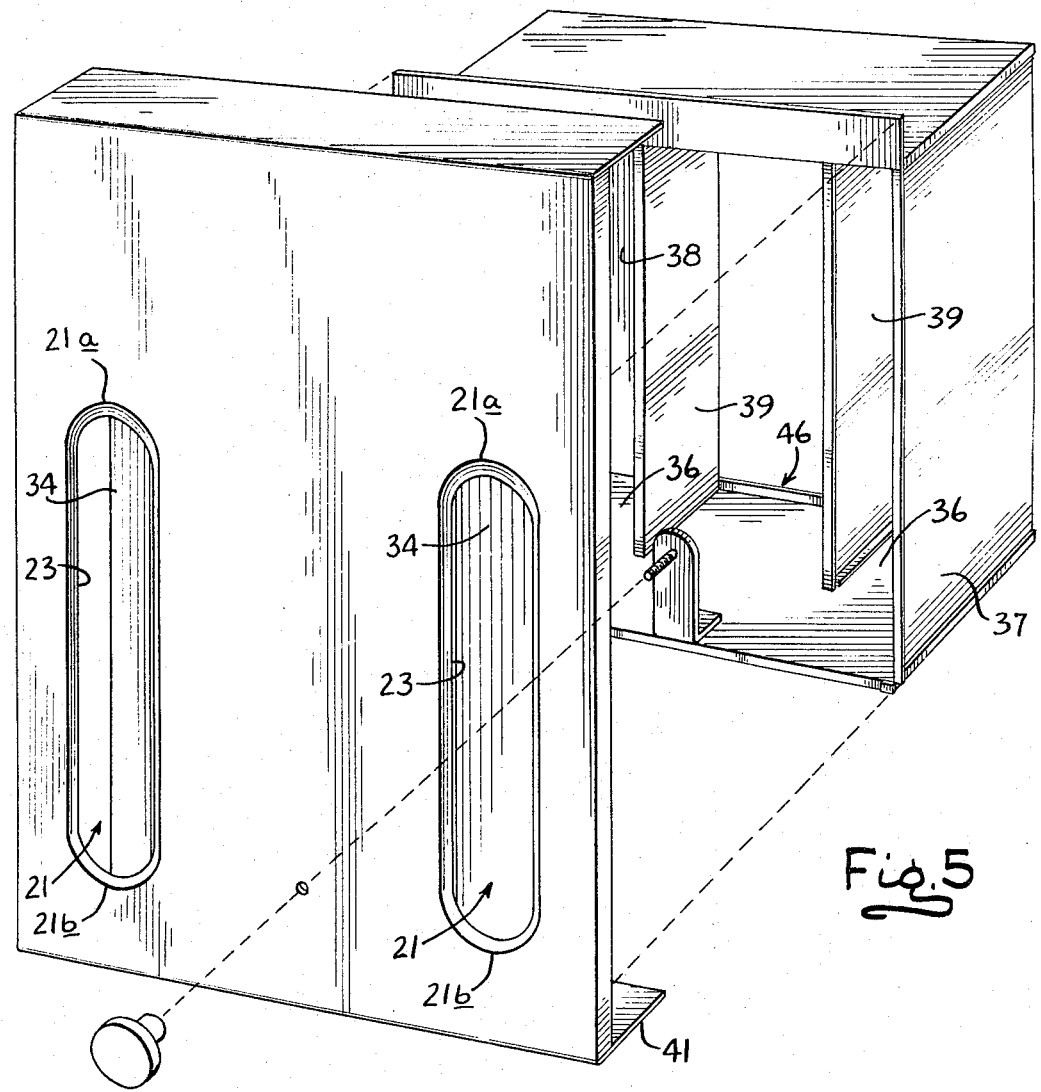
FIG. 5 is an enlarged exploded view of the grease extractor shown in FIGURE 2.
Figure 6:
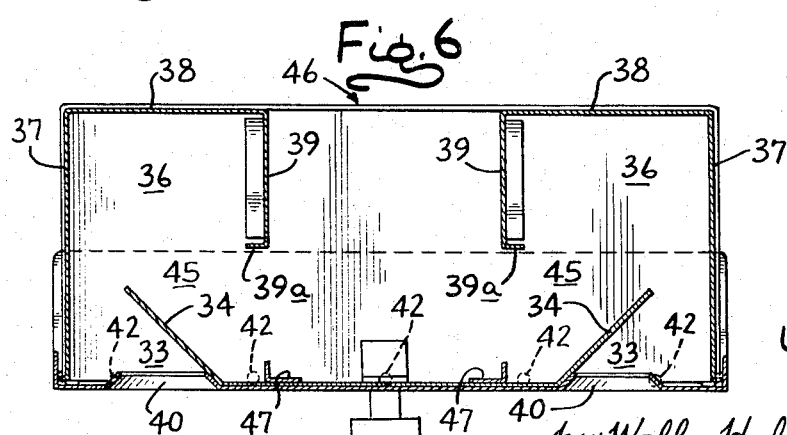
FIG. 6 is a horizontal section taken along line 6—6 in FIGURE 2.

While the invention will be described in connection with a preferred embodiment, it is to be understood that the invention is not to be limited to the disclosed embodiment but, on the contrary, it is intended to cover various modifications and equivalent arrangements included within the spirit and scope of the appended claims.

Turning now to the drawings, in FIGURE 1 there is shown a cooking range 10 having a cooking surface 11 from which hot fumes laden with grease and oil vapors and other contaminants rise upwardly toward a canopy or hood 12 which projects out over at least a portion of the cooking surface 11. The range 10, which may be of any desired design and construction, is aligned with an upwardly extending panel or plate 13 which forms the back of a cabinet 14 supporting the hood 12. In addition to the back panel 13, the cabinet 14 includes a pair of side walls 15 and an inclined front panel 16 which is provided with a suitable holding frame adapted to receive a grease extractor 17.

As the hot, grease-laden fumes collect beneath the hood 12, they are drawn rearwardly and upwardly through the grease extractor 17 by means of a fan or blower 18 which is mounted within a flue or vent duct 19. From the extractor, the vaporous exhaust stream is drawn upwardly through the flue 19 and eventually vented to the atmosphere. It will be understood that the blower 18 represents only one example of a suitable device for drawing the exhaust stream through the extractor, and that the invention is equally applicable to ventilating systems employing other air-moving devices, such as power roof ventilators for example.

For the purpose of controlling the rate of flow of the exhaust stream through the ventilating system, and for protecting against fires in the flue, an adjustable damper 19a is provided at the lower end of the flue 19, as can be seen in FIG. 1.

Turning now to a more detailed description of the grease extractor 17, the hot, grease-laden fumes are drawn into a housing 20 through a pair of vertically elongated, transversely spaced entranceways 21 provided in the front wall 22 of the housing. The housing 20 is generally rectangular in shape, and is preferably mounted in an inclined position with the top of the extractor tilted forwardly as illustrated. The particular position of the extractor may be altered for different applications, but the angle of the face plate is preferably less than about 45° from the vertical position.

In accordance with the present invention, there is provided a grease extractor which comprises the combination of a housing including a front wall forming an entranceway for receiving the vaporous exhaust stream and a rear wall forming an exit opening for discharging the exhaust stream after extraction of the grease therefrom, the front wall including an integral inturned flange extending around the periphery of the entranceway with at least the upper corners of the entranceway being rounded to prevent the dripping of condensed vapors. Thus, in the grease extractor 17 illustrated in the drawings, the front wall 22 of the extractor housing is provided with a pair of integral inturned flanges 23 extending continuously around the peripheries of the two entranceways 21, and both the top and bottom ends 21a and 21b, respectively, of the entranceways are rounded to prevent condensed vapors from accumulating around the entranceways and dripping onto the underlying cooking surface.

It will be appreciated that as the hot vapor-laden exhaust stream enters the extractor 17, some of the vapors tend to condense on the peripheries of the entranceways 21. Moreover, additional condensation takes place on the inside surface of the front wall 22, and a portion of the liquid condensation products flow down to the entranceways 21. These liquids tend to accumulate around the edges of the entranceways, and eventually begin to drip onto the surface lying beneath the extractor.

According to the present invention, it has been found that the undesirable accumulation of liquid condensation products around the extractor entranceways can be avoided by forming an integral inturned flange around each entranceway, and rounding at least the upper corners of the entranceways. In the particular embodiment illustrated in the drawings, the entire end portions of the entranceways 21 are curved or rounded at both the top and bottom so as to form a continuously smooth outline uninterrupted by sharp corners.

The continuous integral flanges 23 shown in the illustrative embodiment may be formed quickly and efficiently by a single stamping operation using suitable dies. Accordingly, this invention may be incorporated in the grease extractor at a minimum manufacturing cost, and yet the performance of the final extractor is vastly improved.

Turning to the internal structure of the grease extractor 17, one particular internal structure will be illustrated and described herein by way of example, but it is to be understood that the invention is equally applicable to many different types of grease exeractors having different internal structures. In the illustrative device, the hot exhaust stream enters the extractor through the dual entranceways 21 and immediately passes through a pair of constrictions 33 defined by a pair of relatively long baffles 34 on one side, and the inturned flanges 23 on the other side. These constrictions sharply reduce the cross-sections of the two portions of the exhaust stream, with a corresponding increase in the fluid velocity. This velocity is generally at least about ten times greater than the velocity at the face of a conventional mesh filter, with a corresponding increase in the pick-up ability of the extractor. From the constrictions 33, the velocious exhaust streams pass into a pair of expansion chambers 36 defined by the side walls 37 and the rear wall 38 of the extractor housing. The increased volume of the expansion chambers 36 cause the exhaust streams to expand rapidly with resultant decreases in the fluid velocity and temperature, thereby causing the grease and oil vapors in the exhaust stream to condense and agglomerate. Although the invention will be described hereinafter with reference to only one exhaust stream, it will be understood that all the flow patterns are duplicated at opposite ends of the extractor.

In order to remove the condensed and agglomerated grease and oil from the continuously moving exhaust stream, the expansion chambers 36 are adapted to reverse the direction of flow of the rearwardly moving exhaust stream so that it flows toward the front of the housing. The centrifugal action resulting from this reversal of flow, which occurs concurrently with the cooling expansion described above, causes the agglomerated grease and oil to be deposited on the walls of the housing. Thus in the illustrative extractor, each expansion chamber 36 is defined by one of the side walls 37, a portion of the rear wall 38, and an inturned rear baffle 39. As the exhaust stream issues from the constriction at the end of the baffle 34, it is directed in an arcuate path by the successive action of the side wall 37, the rear wall 38, and the baffle 39 until it has turned substantially 180° and is flowing forwardly along the rear side of the baffle 34.

The sudden expansion of the velocious exhaust stream and the concurrent centrifugal action from the 180° turn in the fluid flow produces a heavy "plating out" of the agglomerated grease and oil on the inside walls of the expansion chamber. Since the extractor 17 is located directly over the cooking surface 11, the walls of the extractor are at a sufficiently high temperature to cause the deposited grease and oil to remain in substantially fluid condition and run down to the bottom of the housing. Because of the tilted position of the extractor, gravity causes the extracted liquid to run to the lower front corner of the housing, where it seeps through slots 40, between the bottom and front wall of the housing, into a bottom holding tray 41. The holding tray 41, in turn, is provided with a plurality of drain holes 42 which allow the liquid to drip down onto an inclined trough 43 which empties into a grease drawer 44 at the end of the cabinet 14. As the drawer 44 becomes filled with accumulated grease and oil, it can be periodically removed and cleaned.

It shoud be noted that the baffles which define the constriction adjacent the extractor entranceway are adapted to deflect the incoming, grease-laden exhaust stream against the adjacent extractor side wall 37. Consequently, the constriction 33 not only increases the velocity of the exhaust stream prior to its discharge into the expansion chamber 36, but also effects a substantial ram action against the extractor side walls, thereby "plating out" a portion of the grease and oil vapors prior to the expantion. Thus, in the particular embodiment illustrated in the drawings, the baffle 34 which forms the inboard side of the initial constriction extends obliquely back toward the adjacent side wall 37 so as to direct the velocious exhaust stream against that side wall. The exact angle at which the fluid impinges against the side wall 37 should be large enough to provide a substantial ram action for depositing grease on the side wall, but not so large as to unduly reduce the velocity of the exhaust stream. In general, the angle between each side wall 37 and the corresponding projected baffle 34 is suitably on the order of 57° to 58°.

In order to insure that a maximum amount of grease and oil is removed in the expansion chamber 36, the inner end portion 39a of each baffle 39 is bent transversely to the direction of fluid flow so as to form a small lip or trap which collects a substantial portion of the grease and oil which might not have been plated out on the main walls 37, 38 and 39 of the expansion chamber 36. Since the trap lip 39a is located at the outer periphery of the truning exhaust stream, it is in the area of the greatest concentration of remaining grease and oil particles for maximum efficiency.

The residual exhaust stream from each expansion chamber 36 is passed through a second constriction to increase its velocity again, and the resulting velocious stream is passed into a second expansion area where it is allowed to expand again just prior to its discharge from the extractor. This final expansion serves to cool the exhaust stream before its entry into the flue, thereby considerably reducing the fire hazard in the flue. Thus, in the illustrative device, as the exhaust stream flows forwardly after having its flow direction reversed in the expansion chamber 36, it flows through a constriction 45 defined by the back of the baffle plate 34 and the forward edge of the baffle lip 39a. In the particular embodiment illustrated, the second constriction 45 is not as narrow as the first constriction 33 on the front side of the baffle 34, but it nevertheless effects a substantial increase in the fluid velocity by reducing the cross-section of the exhaust stream. It will be appreciated that the relative sizes of the first and second constrictions may be varied without departing from the spirit and scope of this invention.

As the velocious exhaust gases from the constriction 45 pass the baffle lip 39a, they enter a final expansion chamber defined by the front wall 22 of the housing and the opposed sides of the two baffles 39. In this chamber, the two exhaust streams from the opposite sides of the extractor are allowed to expand as they merge with each other, thereby directing the resulting merged discharged stream rearwardly between the opposed surfaces of the baffles 39 and finally out through the exit opening 46 in the rear wall 38. As a result of the cooling expansion of the exhaust gases in this final expansion area, the discharged exhaust stream is at a relatively low temperature which not only protects against fires in the flue, but also helps to increase the longevity of the flue and other downstream portions of the ventilating system.

The cooling expansion of the exhaust stream as it issues from the second constriction 45 also effects a secondary condensing and agglomeration of any grease and oil vapors remaining in the exhaust stream. Moreover, since the merger of the two streams from the opposite sides of the extractor results in a general reversal in the direction of flow of the fluids issuing from the constrictions 45, there is also a secondary centrifugal action which tends to deposit the agglomerated grease and oil on the front wall 22 of the housing. For the purpose of insuring that a maximum amount of agglomerated grease and oil is plated out on the housing walls prior to the merger of the fluid streams, a pair of traps in the form of rearwardly projecting lips or flanges 47 are mounted on the inner surface of the front wall 22 directly opposite the two baffles 39. As in the case of the traps 39a, the traps 47 are located at the outer periphery, i.e., in the area of greatest grease density, of the turning exhaust stream.

It will be appreciated that all the internal surfaces of the grease extractor extend either vertically or at a steep angle (less than 45° from vertical) so that no matter where the extracted grease and oil are deposited within the housing, they are free to run downwardly over smooth, uninterrupted surfaces to the lower front corner of the extractor where they are drained out of the gas stream into the holding tray 41. Similarly, this construction also facilitates cleaning of the extractor, since cleaning solutions can run freely through the extractor in the same manner as the grease and oil, and over the same surfaces.

It will be appreciated that the grease extractor provided by this invention is especially adaptable to simple and economical manufacture. As mentioned previously, the inturned flanges around the extractor entranceways may be formed quickly and efficiently by a single stamping operation. Moreover, the main housing of the extractor can be conveniently constructed in two main sections, a front section which forms the front wall 22, and a back section which forms the remainder of the housing. The front section may consist of a flat metal sheet defining the entranceways, with appropriate baffle elements being spot welded to the inner surface of the sheet between the two entranceways. The back section may consist simply of a pair of performed sheets forming the rear and side walls and being spot welded to the top and bottom sheets to complete the housing. For the purpose of connecting the two sections, a clip 50 may be provided on the inner surface of the front wall 22 for receiving a vertical flange 51 on the upper front corner of the back housing section. After the flange 51 has been inserted into the clip 50, the lower portion of the housing is swung down against the front wall 22 so that a stud bolt 52 projects through a registering aperture 53 formed in the front section of the housing. An internally threaded knob 54 is then threaded onto the stud bolt 53 to lock the two sections firmly together. In order to form the grease-draining slots 40 at the lower front corner of the extractor housing, above the tray 22, the rear section of the housing is provided with a depending flange 55 which is spaced slightly away from the front wall 22 by bending over the two outside corners 56 of the flange, as shown in FIGURE 5. The bent corners 56 serve as spacer elements which form a continuous slot 40 having a width approximately equal to the thickness of the metal used to form the bottom wall of the housing.

As can be seen from the foregoing detailed description, this invention provides an improved grease extractor which prevents condensed vapors from dripping from the periphery of the entranceways to the extractor. More particularly, the inturned flanges extending around the extractor entranceways and the curvilinear configuration at the entranceways serve to prevent the accumulation of condensed vapors around the peripheries of the entranceways so as to prevent dripping of the condensed vapors from the extractor onto the underlying cooking surfaces. This invention provides a significant improvement in the performance of filterless grease extractors, and yet does not add significantly to the manufacturing costs since the inturned flanges and the rounded configuration of the extractor entranceways can be manufactured quickly and efficiently by simple stamping operation.

I claim as my invention:

1. In combination with a kitchen hood, a grease extractor for removing grease, oil and other contaminants from a vaporous exhaust stream, which grease extractor comprises a housing including a front wall forming an entranceway fo rreceiving the vaporous exhaust stream, a rear wall forming an exit for discharging the exhaust stream after the extraction of the grease and other contaminants therefrom, and an internal baffling arrangement interposed between the front wall and the rear wall so as to extract the grease and other contaminants from a vaporous stream entering the housing through the entranceway formed by the front wall, the front wall including an integral inturned flange extending inwardly from said front wall around the periphery of the entranceway, with no portion of said flange extending beyond the outer face of said front wall, and with at least the upper corners of the entranceway being rounded to prevent the dripping of condensed vapors therefrom.

2. In combination with a kitchen hood, a grease extractor as defined in claim 1 in which the entranceway has a smooth curvilinear configuration at both the top and bottom ends thereof and in which said integral inturned flange extends completely around the periphery of the entranceway.

3. In combination with a kitchen hood, a grease extractor for removing grease, oil and other contaminants from a vaporous exhaust stream, which grease extractor comprises a housing including a front wall forming an entranceway for receiving the vaporous exhaust stream, a rear wall forming an exit for discharging the exhaust stream after the extraction of grease and other contaminants therefrom and an internal baffling arrangement interposed between the front wall and the rear wall of the housing so as to extract the grease and other contaminants from a vaporous stream entering the housing through the entranceway formed by the front wall, the periphery of said entranceway being rounded at the corners to provide a continuously smooth configuration uninterrupted by sharp corners and the front wall of said housing including an integral inturned flange extending inwardly from said front wall around the periphery of said entranceway to prevent the dripping of condensed vapors therefrom, with no portion of said flange extending beyond the outer face of said front wall.

References Cited

UNITED STATES PATENTS

| | | | |
|---|---|---|---|
| 1,789,613 | 1/1931 | Walker | 55—419 |
| 2,393,957 | 2/1946 | Baumgartner | 126—299 |
| 3,125,941 | 3/1964 | Grout et al. | 98—18 |
| 3,295,433 | 1/1967 | Fox et al. | 98—115 |

ROBERT A. O'LEARY, *Primary Examiner.*

M. A. ANTONAKAS, *Assistant Examiner.*